Figure 1:
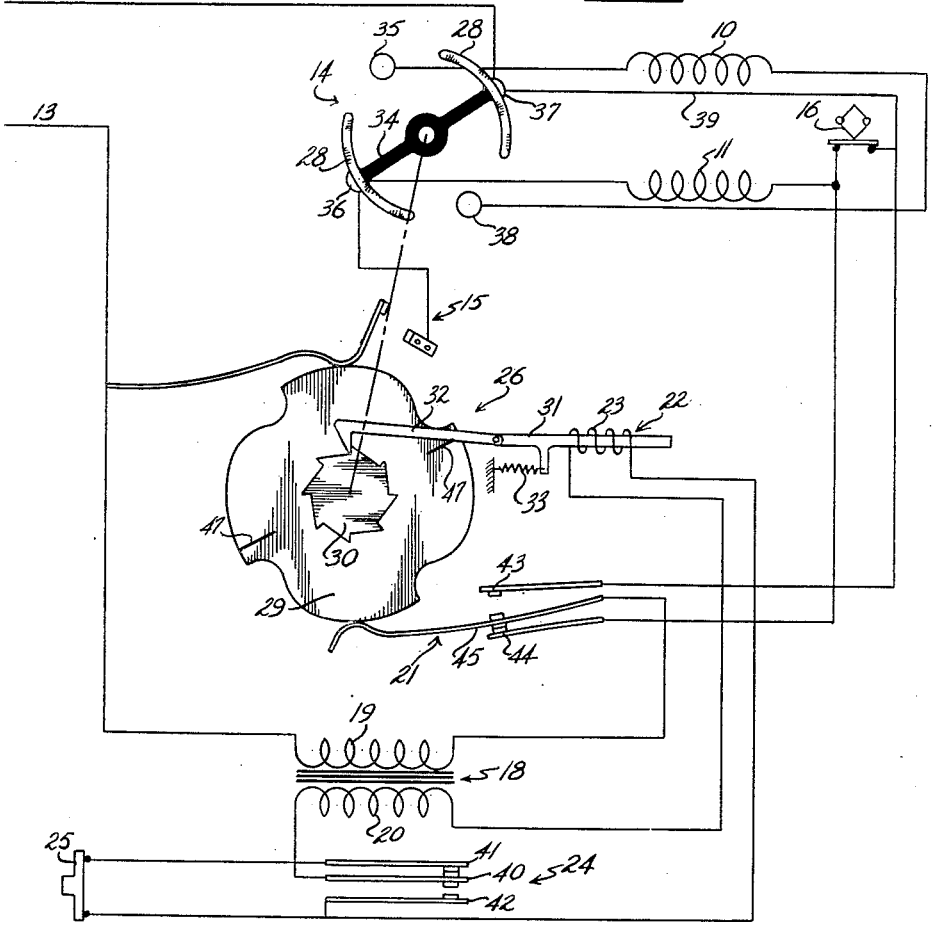

Jan. 9, 1951 H. H. OLSEN 2,537,155
ELECTRIC MOTOR INDEXING AND REVERSING CIRCUIT
Filed Dec. 29, 1948 2 Sheets-Sheet 1

Inventor
HENRY HANS OLSEN
By The Firm of Charles W. Hills Attys

Jan. 9, 1951          H. H. OLSEN          2,537,155
ELECTRIC MOTOR INDEXING AND REVERSING CIRCUIT
Filed Dec. 29, 1948          2 Sheets-Sheet 2
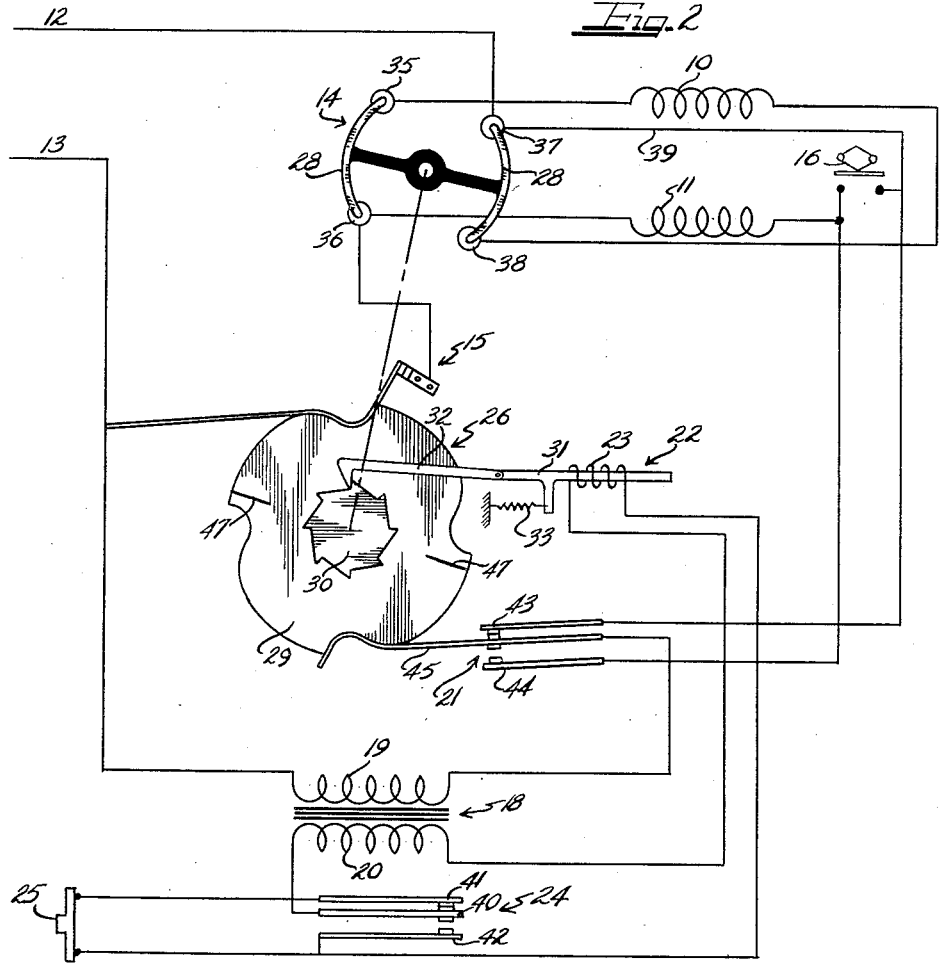
Fig. 2
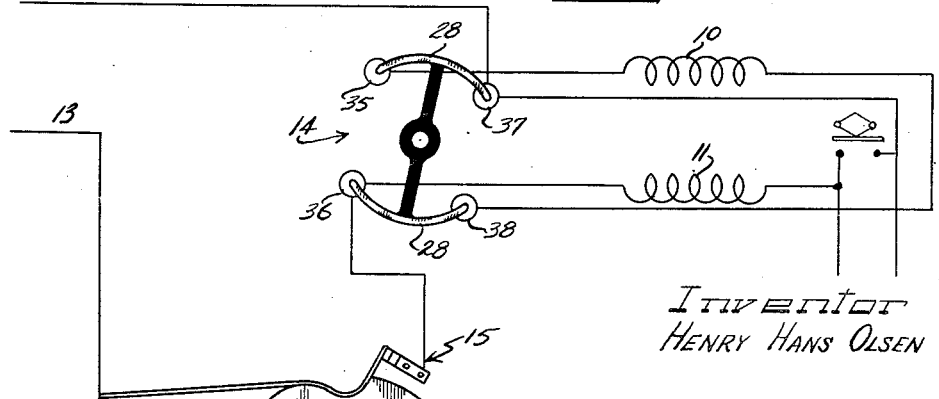
Fig. 3
Inventor
HENRY HANS OLSEN
by The Firm of Charles W. Hills Attys.

Patented Jan. 9, 1951

2,537,155

UNITED STATES PATENT OFFICE 2,537,155

ELECTRIC MOTOR INDEXING AND REVERSING CIRCUIT

Henry Hans Olsen, Detroit, Mich., assignor to Crawford Door Company, Detroit, Mich., a corporation of Michigan Application December 29, 1948, Serial No. 67,839

6 Claims. (Cl. 318—207)

This invention relates to a motor reversing circuit, and more particularly, to a means for reversing and indexing the operation of motors which make use of disconnectable starting windings during starting and reversing operations.

Among motors which make use of disconnectable starting windings are types such as split-phase induction motors and capacitor-start motors which have certain advantages of high starting torque and low cost which make them particularly desirable for use in driving many specific pieces of apparatus in both home and industry. Such motors besides being provided with a starting winding, are provided with a main field winding, the starting winding being in the motor circuit during only the periods of low speed acceleration and usually periods of deceleration approaching rest. It is usual in the operation of such motors that speeds above approximately 70% of full speed, the starting winding is disconnected to allow the motor to continue acceleration to full speed as a regular induction motor. Disconnection of the auxiliary winding is effected usually by a centrifugal switch mounted on the rotor shaft, or, by a switch thermally or magnetically operated. Reversal of such motors is effected by reversing the polarity of either the main field winding or the starting field winding.

One operating limitation of such motors, however, is that when connected to operate at full speed and a sudden operation of the reversing control is effected, the motor will normally not reverse but will continue to run in the same direction. This undesirable operating characteristic is caused by the fact that the switch in the starting winding branch of the circuit does not have sufficient time within which to operate so that the starting winding may be energized to create a reverse rotation starting field. Since the starting winding thus does not come into play, the motor continues to rotate in the same direction, even though the polarity of the main field may have been reversed and the reversing controls have been operated.

Reversal of a motor can, however, be effected by first de-energizing the motor and allowing it to slow up to a speed at which the centrifugal switch will connect the starting winding in the circuit, or to wait for a period to allow any other type of switch which may be in the circuit to operate, and then by operating the reversing control, the motor will have a reverse starting torque developed therein which will begin driving in the opposite direction until the starting winding again is disconnected.

This invention has, therefore, for one of its principal features and objects, the provision of a reversing control circuit which will assure positive reversal of motors having disconnecting starting windings.

It is another object of this invention to provide a means to effect motor reversal which will eliminate the possibility of too sudden a reversal of the motor.

Still another object of the present invention is to provide a means to effect motor reversal which makes it impossible to energize the reversing control system until the starting winding is connected in the motor circuit.

A further object of the present invention is to provide a novel indexing means which will indicate the direction in which the motor will rotate when energized.

It is a still further object of this invention to provide means which will enable the use of limit switches to operate elements in the motor circuit in preparation for a motor reversal.

The novel features which I believe to be characteristic of my invention are set forth with particularity in the appended claims. My invention, however, as to its organization, manner of construction, and method of operation, together with further objects and advantages thereof may be best understood by reference to the following description taken in connection with the accompanying drawings in which:

Figure 1 is a motor circuit diagram showing both symbolic and diagrammatic representations of electrical elements embodying the principles of my invention;

In Figure 2, the motor circuit elements are shown as they are connected when the motor is energized and running at full speed; and Figure 3 is a circuit diagram showing some of the elements of Figure 1 as they are connected when the motor is energized and running at full speed in a direction opposite to that for which it is connected in Figure 2.

On the drawings:

Referring now more particularly to the drawings in which like numerals designate like parts in the various figures, Figure 1 shows a split-phase motor circuit having a motor main field winding or what is also commonly termed a running winding 10, a starting winding 11, together with a line lead 12 from a suitable source of alternating current voltage connected to the terminals of a main field reversing switch 14 which, in turn, is connected through a field energizing switch 15 to another line lead 13 of the source of alternating current supply voltage. An element which performs both as a motor element and as a control element is a centrifugal switch 16 mounted for rotation on the shaft of the motor armature (not shown). The centrifugal switch 16, which, as indicated previously, may be any other suitable winding switch such as a magnetically or thermally operated type, is connected between the starting winding 11 and voltage supply 12.

Control elements in the circuit comprise a control transformer 18 which has its primary winding 19 connected across the voltage supply source by having one end of the primary winding directly connected to voltage supply lead 13 and its other end connected indirectly to the other voltage supply lead 12 through both a cam-operated transformer switch 21 and the centrifugal switch 16. The secondary winding 20 of transformer 18 is connected to enable both manual and automatic energization of the winding 23 of solenoid 22 by causing its load to be connected through a limit switch 24 and a normally open push-button 25.

Operation of the motor is governed by the position of a ratchet and solenoid-operated cam mechanism 26 which is mechanically connected to actuate a pair of rotatable bridging contacts 28 of motor reversing switch 14. The cam mechanism 26 also operates the field energizing switch 15, as well as the control transformer switch 21.

Cam 29 of the cam mechanism 26 is arranged to have eight positions, namely: four motor operating positions which alternate with four intermediate motor de-energizing position. The position of the cam is determined by a mechanically connected positioning ratchet 30 provided with eight teeth and operated by solenoid 22 which has a core 31 with a ratchet-actuating arm 32 hinged thereto. Thus, each time solenoid 22 is energized, core 31 is drawn into the solenoid winding 23 thus rotating both the ratchet 30 and the cam 29 to a new position. The core 31 is then withdrawn from solenoid winding 23 by a biasing spring 33 engaged therewith. In Figure 1, cam 29 is shown in an intermediate position in which the motor is de-energized, since the cam-operated field energizing switch 15 is open. The bridging contacts 28 of the motor reversing switch 14 are also intermediately positioned since they are driven by the cam 29. That is, the bridging contacts 28 are mounted on a non-conducting arm 34 which is mechanically connected to the cam 29.

The reversing switch 14 has four stationary contacts 35, 36, 37 and 38 symmetrically disposed for electrical engagement by the bridging contacts 28. The motor running winding 10 is connected between the contacts 35 and 38, while the voltage supply lead 12 and the centrifugal switch lead 39 are connected to contact 37, and one end of the starting winding 11 as well as one terminal of the field energizing switch 15 are connected to contact 36. Because of its symmetry, switch 14 has four intermediate positions, but only two controlled operations. In Figure 1, the switch is shown in intermediate position in which none of the stationary contacts are electrically connected. In such condition, the motor is de-energized and would either be at rest or be decelerating to rest after having been energized.

Figure 2 shows the switch 14 in one of its operating positions which might be, for explanation purposes, considered the forward operating position. In this position, the contacts 35 and 36 are joined by one of the bridging contacts 28, while the contacts 37 and 38 are electrically joined by the other of the bridging contacts 28. In each of the motor operating positions of the switch 14, the field energizing switch 15 is arranged to close, as shown, thus energizing the motor running winding 10. In the particular instance represented, current is supplied to the running winding 10 through an electrical connection from the switch 15 to the contact 36 which is electrically connected to the contact 35 by one of the bridging contacts 28 and thence through the winding 10 which has its other end joined to the alternating current winding 12 through the contact points 37 and 38 bridged by the bridging contact 28. The starting winding 11 is energized at low speeds of the motor when the centrifugal switch 16 is closed. Energization of this winding is effected by connecting one side to the contact 36 which is electrically joined to the alternating current supply lead 13 through the closed field energizing switch 15, while, on the other side, the winding is energized by the alternating current supply lead 12 through the closed centrifugal switch 16 and the centrifugal switch lead 39. When the motor reaches a speed somewhat in the order of 70% of full load speed, the centrifugal switch 16 opens, thus disconnecting the running winding 11 from the supply lead 12, allowing the motor to continue acceleration to full speed under the influence of the running winding 10 alone.

Reverse rotation of the motor is effected when the motor reversing switch 14 is positioned as shown in Figure 3, wherein the contacts 35 and 37 are bridged by one of the bridging contacts 28 while the contacts 36 and 38 are bridged by the other bridging contact 28. Under these conditions, the motor operating at low speed has its starting winding 11 energized in the same direction as for forward rotation in Figure 2, while the polarity of running winding 10 is the reverse of that for forward rotation. The reverse polarity of the winding 10 is effected by connecting the end of the winding joined to contact 35 to the alternating current supply lead 12 instead of the supply lead 13, as was done in Figure 2, and by connecting the other end of the winding joined to contact point 38, to the alternating current supply lead 13, instead of the supply lead 12, as was done in Figure 2. In both Figures 2 and 3, the centrifugal switch 16 is shown open, as is the condition when the motor is running at full speed, or speeds above approximately 70% of full speed. This 70% value, however, is by no means meant to be limiting since the switch may be an adjustable type operable at various speeds such as the standard type speed adjustable centrifugal switches usually in use with split phase and condenser starting motors.

To de-energize the running motor, the push button 25 is operated to energize solenoid 22, thus moving the cam 29 and the motor reversing switch 14 to an intermediate motor de-energizing position. The same condition occurs if the limit switch 24 is operated such as by an element on the driven equipment. In the latter situation, a common contact 40 of the limit switch is moved to engagement with a stationary contact 42 to close the secondary circuit of the transformer 18. Under normal conditions, however, the contact 40 is in engagement with a contact 41 of the limit switch 24 to enable manual closing of the secondary circuit by pressing the normally open push button 25.

It is a feature of my invention that the control transformer 18 is energized at all times except periods of deceleration from full speed to the speed at which the centrifugal switch 16 closes. This is accomplished by connecting one side of the transformer primary winding 19 through the cam-operated single pole switch 21, which has one of its contact sides 43 connected to one side of the centrifugal switch 16, and has its other contact side 44 connected to the other side of the centrifugal switch 16, so that the contact side 44 can be connected to the line 12 only through the closed centrifugal switch 16. The movable contact 45 of the single pole switch 41 makes contact with the contact side 43 in each of the operating positions of the cam 29, thus energizing the transformer 18 during all periods of acceleration and full speed operation of the motor. When the cam 29 is moved to any one of its intermediate positions, by actuation of either the push button 25 or the limit switch 24, the movable contact 45 makes contact with the contact side 44 so that the transformer 18 can be energized only when the centrifugal switch 16 is closed. Since when the cam 29 is in one of its intermediate positions the centrifugal switch 16 is open only during those periods of deceleration between full speed and the speed at which it is adjusted to close, the transformer 18 cannot be energized during these periods. Consequently, the solenoid 22 also cannot be energized during these periods.

When the motor is operating at full speed, therefore, and it is desired to reverse the direction of rotation, it is necessary to first press the button 25 to de-energize the motor and then wait for a period until the centrifugal switch 16 closes. An actuation of the reversing controls cannot be effected before such closure since control transformer 18 is not energized during periods of deceleration at high speeds. Thus, a reverse starting torque will always be produced each time an operation of the reversing controls is effected.

It is another feature of my invention, therefore, that cam 29 can be marked with forward and reverse marks, as at points 47, to indicate the direction in which the motor will next operate when the push button 25 or the limit switch 24 are operated. This may be done by marking the cam itself, or arranging some associated piece of apparatus with the cam 29 to indicate the rotation. Such indicating means is enabled by the fact that the present circuit makes it impossible to operate the motor in more than one direction with the same polarity of the running field winding. The present invention eliminates such possibility by making it impossible to reverse the controls while the motor is operating at high speeds. Another advantage is thus effected in that severe plugging of the motor with accompanying high stresses and strains on mechanical parts of the motor and driven equipment cannot be made to occur when the motor controls are connected as disclosed.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. In a control circuit for a reversible motor having a main winding and a starting winding, switch means for reversing the relative polarity of said windings, a speed-responsive switch in the circuit of said starting winding and adjusted to open the circuit thereof above a predetermined speed, indexing means connected to said switch means for actuating said switch means step by step from a forward position to a neutral position to a reverse position to a neutral position and back to a forward position, control means for energizing said actuating means to advance said switch means one step, and means for inserting said speed-responsive switch in the energizing circuit of said control means whenever said switch means is in a neutral position, whereby said switch means can be advanced to its next operative position only when said motor is below said predetermined speed.

2. In a control circuit for a reversible motor having a main winding and a starting winding, switch means for reversing the relative polarity of said windings, a speed-responsive switch in the circuit of said starting winding and adjusted to open the circuit thereof above a predetermined speed, indexing means connected to said switch means for actuating said switch means step by step from a forward position to a neutral position to a reverse position to a neutral position and back to a forward position, a step-down transformer having a primary and a secondary, a low voltage control circuit including said secondary, a control switch and means for actuating said indexing means, an energizing circuit for the primary of said transformer, and auxiliary switch actuated by said indexing means for connecting said transformer primary directly to a source of power when said switch means is in one of its operative positions and serially connected to a source of power through said speed-responsive switch whenever said switch means is in one of its neutral positions.

3. In a circuit for a motor having a starting winding and means for disconnecting said winding at speeds above a certain value near full speed, a pair of energizing leads, a reversing switch for said motor, an energizing switch between one of said leads and said winding, an electrical actuating means for operating said reversing and energizing switches, a single pole double-throw switch having a contact side connected to each side of said disconnecting means, the movable pole of said double-throw switch being electrically connected to one side of said actuating means, the other side of said actuating means being connected to said one lead, and said actuating means being mechanically arranged to operate each of said switches so that a motor reversal cannot be effected at speeds above said value near full speed.

4. In a circuit for an alternating current motor having a starting winding and a series connected automatic means for disconnecting said winding at speeds above a predetermined value near full running speed of said motor, a means for reversing said motor, an energizing switch connected in series with both said reversing means and said starting winding, a single pole double-throw switch having a contact side electrically connected to each side of said disconnecting means, said single pole switch having a common movable contact capable of electrical contact with each of said contact sides, a cam actuating means common to both said disconnecting switch and said single pole switch, said actuating means being arranged to operate said motor reversing means, said actuating means having an electrical connection with said movable contacts of said single pole switch, said actuating means also being arranged to operatively engage said energizing switch and said movable single pole common contact so that a motor reversal cannot be effected at speeds above said predetermined value.

5. In a motor circuit for an alternating current motor having a starting winding and a series connected automatic starting winding disconnect switch, a running winding and a running winding reversing switch for said motor, an energizing switch connected in series with both the circuit branch containing said reversible winding and the circuit branch containing said starting winding, a source of alternating current supply connected across both said circuit branches and said common connected energizing switch, an electro-mechanical actuator for said motor reversal means, a single pole double-throw switch having one contact side electrically connected to the point of connection between said disconnect switch and current supply source, the other contact side of said switch having an electrical connection to the point of connection between said starting winding and said disconnect switch, said single pole switch having a common contact which makes normal electrical contact with said one contact side and movable contact with said other contact side, a control transformer having its primary connected between said common contact and the line side of said energizing switch, said actuator being electrically connected in the secondary winding of said transformer, said actuator being arranged in operating engagement with both said energizing switch and said common contact of said single pole switch in such manner that said common contact makes movable engagement with said other contact side when said energizing switch is open.

6. In a motor control circuit for a motor having a running winding, a starting winding, a combination de-energizing and polarity reversing field winding switch associated with one of said windings and a disconnecting switch for said starting winding, a single pole double-throw switch having a contact side electrically connected to each side of said disconnecting switch, said single pole switch having a movable contact which makes normal contact with one of said contact sides and movable contact with the other of said contact sides, a source of voltage supply, electrical means for positioning said field winding switch, said positioning means being connected between said movable contact and one side of said source of voltage supply, the other side of said source of supply being connected to the contact side of said single pole switch normally contacted by said movable contact, said electrically operated positioning means being arranged to cause electrical contact between said movable contact and movably contacted contact sides when said field winding switch is in de-energized position.

HENRY HANS OLSEN.

REFERENCES CITED

The following references are of record in the file of this patent:

UNITED STATES PATENTS

| Number | Name | Date |
|---|---|---|
| 1,576,276 | Hedges et al. | Mar. 9, 1926 |
| 2,315,582 | Blodgett | Apr. 6, 1943 |